United States Patent
Reddy et al.

(10) Patent No.: US 6,478,869 B2
(45) Date of Patent: *Nov. 12, 2002

(54) FLOW PROPERTIES OF DRY CEMENTITIOUS MATERIALS

(75) Inventors: Baireddy R. Reddy, Edmond, OK (US); Ronald E. Sweatman, Montgomery, TX (US); James F. Heathman, Katy, TX (US); Russell M. Fitzgerald, Duncan, OK (US); Ronald J. Crook, Duncan, OK (US)

(73) Assignee: Halliburton Energy Services, inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/815,903

(22) Filed: Mar. 23, 2001

(65) Prior Publication Data

US 2001/0014651 A1 Aug. 16, 2001

Related U.S. Application Data

(63) Continuation of application No. 09/229,245, filed on Jan. 12, 1999.

(51) Int. Cl.[7] .............................................. C04B 24/04
(52) U.S. Cl. ...................... 106/724; 106/728; 106/810; 106/823
(58) Field of Search ................................ 106/724, 728, 106/810, 823

(56) References Cited

U.S. PATENT DOCUMENTS

| | | | |
|---|---|---|---|
| 2,609,882 A | 9/1952 | Morgan et al. ................ 166/22 |
| 2,776,713 A | 1/1957 | Morgan et al. ................ 166/22 |
| 2,857,286 A | 10/1958 | Striker ........................ 106/90 |
| 2,880,102 A | 3/1959 | Woodard et al. ............. 106/90 |
| 3,094,425 A | 6/1963 | Adams et al. ................ 106/90 |
| 3,329,517 A | 7/1967 | Dodson et al. ............... 106/90 |
| 3,467,193 A | 9/1969 | Messenger ................. 166/292 |
| 3,607,326 A | 9/1971 | Serafin |
| 3,615,785 A | 10/1971 | Moorer et al. ............. 106/314 |
| 4,097,423 A | 6/1978 | Dieterich |
| 4,110,225 A | 8/1978 | Cagle |
| 4,255,276 A | 3/1981 | Fahn et al. ................ 252/184 |
| 4,264,698 A | * 4/1981 | Takayama et al. |
| 4,386,963 A | 6/1983 | Lange ........................ 106/117 |
| 4,482,381 A | 11/1984 | Spitz et al. .................. 106/90 |
| 4,505,751 A | 3/1985 | Sydansk ...................... 106/84 |
| 4,643,362 A | 2/1987 | Serafin ........................ 241/16 |
| 4,711,401 A | 12/1987 | Serafin ........................ 241/16 |
| RE32,742 E | 9/1988 | Skjeldal ....................... 106/98 |
| 4,960,740 A | 10/1990 | House et al. ............... 501/148 |
| 5,125,455 A | 6/1992 | Harris et al. ............... 166/292 |
| 5,149,370 A | 9/1992 | Olaussen et al. ........... 106/737 |
| 5,207,832 A | 5/1993 | Baffreau et al. ............ 106/727 |
| 5,275,654 A | 1/1994 | Cowan ....................... 106/661 |
| 5,294,255 A | 3/1994 | Smetana et al. ............ 106/698 |
| 5,327,968 A | 7/1994 | Onan et al. ................. 166/293 |
| 5,346,012 A | 9/1994 | Heathman et al. .......... 166/293 |
| 5,352,277 A | * 10/1994 | Sasaki |
| 5,375,660 A | 12/1994 | Wehunt ....................... 166/271 |
| 5,387,283 A | 2/1995 | Kirkpatrick et al. ........ 106/709 |
| 5,429,675 A | 7/1995 | Cheung et al. ............. 106/802 |
| 5,447,197 A | 9/1995 | Rae et al. ................... 166/293 |
| 5,472,501 A | 12/1995 | Dastol ........................ 106/823 |
| 5,536,310 A | * 7/1996 | Brook et al. |
| 5,547,506 A | 8/1996 | Rae et al. ................... 106/730 |
| 5,549,745 A | 8/1996 | Langenohl et al. ......... 106/692 |
| 5,556,458 A | * 9/1996 | Brook et al. |
| 5,587,012 A | 12/1996 | Montgomery ............... 106/823 |
| 5,588,990 A | * 12/1996 | Dongell |
| 5,672,203 A | 9/1997 | Chatterji et al. ............ 106/808 |
| 5,733,819 A | * 3/1998 | Kodama et al. |
| 5,769,939 A | 6/1998 | Dingoyr et al. ............. 106/737 |
| 5,783,489 A | * 7/1998 | Kaufman et al. ........... 438/692 |
| 5,814,145 A | 9/1998 | Dugat et al. ................ 106/737 |
| 5,820,670 A | 10/1998 | Chatterji et al. ............ 106/727 |
| 5,968,255 A | 10/1999 | Mehta et al. ................ 106/724 |
| 5,972,103 A | 10/1999 | Mehta et al. ................ 106/728 |
| 5,989,336 A | 11/1999 | Carpenter et al. .......... 106/811 |
| 6,086,669 A | * 7/2000 | Patkar et al. ............... 106/491 |
| 6,245,142 B1 | 6/2001 | Reddy et al. ................ 106/724 |

FOREIGN PATENT DOCUMENTS

| | | | |
|---|---|---|---|
| EP | 0 249 408 A1 | | 12/1987 |
| EP | 314242 | | 5/1989 |
| EP | 466646 | * | 1/1992 |
| EP | 0 507 368 A1 | | 10/1992 |
| JP | 07059846 | * | 3/1995 |
| JP | 09048816 | * | 2/1997 |
| NL | 7201502 A | | 8/1973 |
| SU | 1235845 | * | 6/1986 |
| WO | WO 9858628 | * | 12/1998 |
| WO | WO 99/28264 | | 10/1999 |

OTHER PUBLICATIONS

Thin layer silica gel chromatography of tissue lipids in meat, Yakubov et al. Myas INd SSSR (1973), 6, 34–6.*

Japan Patent Abstract JP 10 212146 A dated Nov. 30, 1998.

"Evaluation of factors affecting lipid binding in wheat flours" Pomerantz et al., J Agr Food Chem (19680 16(16), pp. 978–8.

Concrete Admixtures Handbook Properties, Science, and Technology (pp. 518–521) by V.S. Ramachandran (No Date Available).

* cited by examiner

Primary Examiner—Paul Marcantoni
(74) Attorney, Agent, or Firm—Craig W. Roddy; C. Clark Dougherty, Jr.

(57) ABSTRACT

Methods of improving the flow properties of one or more dry particulate cementitious materials are provided. The methods are basically comprised of dry-blending a particulate flow enhancing additive comprised of a particulate solid adsorbent material having a flow inducing polar molecule producing chemical adsorbed thereon with said cementitious materials.

9 Claims, No Drawings

FLOW PROPERTIES OF DRY CEMENTITIOUS MATERIALS

CROSS-REFERENCE TO RELATED APPLICATION

This application is a continuation of application Ser. No. 09/229,245 filed Jan. 12, 1999.

BACKGROUND OF THE INVENTION

1. Field of the Invention

The present invention provides methods of improving the flow properties of dry particulate cementitious materials whereby the materials can be readily conveyed out of storage tanks and the like.

2. Description of the Prior Art

Cementitious materials such as hydraulic cements, slag, fumed silica, fly ash and the like having various particle size distributions are often dry-blended and placed in storage tanks. The storage tanks containing the cementitious materials are also often transported by land or sea to locations where the cementitious materials are to be used. During such transportation, the cementitious materials are subjected to vibrations and as a result, the materials are tightly packed under static conditions. One or more of the cementitious materials are often of ultra-fine particle sizes, i.e., sizes in the range of from about 5 to about 100 microns, which causes the tightly packed problem to be more severe. When the cementitious materials are conveyed out of the storage tanks at the locations of use, significant portions of the tightly packed materials are often left in the storage tanks. The incomplete conveying of the materials results in costs for disposing of the materials and increased costs to the person or entity using the cementitious materials.

Cementitious materials have heretofore been treated to make them more flowable. For example, U.S. Pat. No. 2,857,286 issued to Striker on Oct. 21, 1958 discloses a process of treating Portland cement with acetic acid or a water soluble salt of acetic acid whereby the Portland cement becomes more flowable. In accordance with the Striker patent, the treatment of Portland cement with the acid or acetate is carried out either concurrently with, or subsequent to, the grinding of the cement clinker. The acid or acetate can be combined with the cement during grinding or the ground cement can be treated by injecting the acid or acetate into the cement under pressure as a vapor in order to blow the cement and uniformly contact it with the acid or acetate.

U.S. Pat. No. 3,094,425 issued to Adams et al. on Jun. 18, 1963 discloses that most cements compacted by vibration become semi-rigid and will not flow without considerable mechanical effort to break up the compaction. This condition is known as "pack set." Further, it is stated that it is known that certain polar molecules when added to ground cement will attach to the cement particles and reduce their surface forces. In accordance with the Adams patent, a mixture of calcium acetate and lignin sulfonate is an effective grinding aid and a pack set inhibitor when added to the cement mill and interground with the cement.

U.S. Pat. No. 3,615,785 issued to Moorer et al. on Feb. 2, 1968 discloses a cement grinding aid and pack set inhibitor comprised of polyol and a water soluble salt of an aliphatic acid having no more than 3 carbon atoms.

The above described additives are difficult to handle and must be added to the cement prior to or after grinding. Since commercially available cementitious materials generally do not include such additives, they must be provided, handled and combined with ground cement by the user by spraying, mechanical mixing or other time consuming procedure.

Thus, there are continuing needs for improved methods of enhancing the flow properties of dry cementitious materials which are stored and/or transported in storage tanks.

SUMMARY OF THE INVENTION

The present invention provides improved methods of enhancing the flow properties of a dry particulate cementitious material or a blend of such materials which meet the needs described above and overcome the deficiencies of the prior art. The methods basically comprise dry-blending a particulate flow enhancing additive comprised of a particulate solid adsorbent material having a flow inducing chemical adsorbed thereon with the cementitious materials prior to placing the materials in a storage tank.

The particulate flow enhancing additive of this invention is easily handled, readily dry blended with cementitious materials and enhances the flow properties of the cementitious materials. The presence of the flow enhancing additive in the cementitious materials allows the cementitious materials to be mechanically or pneumatically conveyed out of storage tanks, even when they are tightly packed therein, without leaving significant portions of the cementitious materials in the storage tanks.

A preferred particulate flow enhancing additive useful in accordance with this invention is comprised of precipitated silica powder having a flow inducing chemical comprised of glacial acetic acid adsorbed thereon. The weight ratio of precipitated silica powder to the glacial acetic acid in the flow enhancing additive is in the range of from about 90:10 to about 10:90, and the additive is blended with cementitious materials in an amount in the range of from about 0.01% to about 1.0% by weight of the cementitious materials.

It is, therefore, a general object of the present invention to provide improved methods of enhancing the flow properties of dry particulate cementitious materials.

Other and further objects, features and advantages of the present invention will be readily apparent to those skilled in the art upon a reading of the description of preferred embodiments which follows.

DESCRIPTION OF PREFERRED EMBODIMENTS

The present invention provides methods of improving the flow properties of one or more dry particulate cementitious materials such as hydraulic cements, slag, fumed silica, fly ash and the like. The methods of the invention are particularly suitable for improving the flow properties of a dry particulate cementitious material or a blend of such materials which are of fine or ultra-fine particle size and are tightly packed under static conditions in a storage tank from which they must be conveyed. This invention also provides methods of storing one or more dry particulate cementitious materials in a storage tank, transporting the storage tank and cementitious materials therein to a location of use and then conveying the cementitious materials out of the storage tank without unintentionally leaving a significant portion of the cementitious materials in the storage tank. The term "significant portion" is used herein to mean a portion of the stored cementitious material that is above about 15% thereof by volume.

The methods of this invention are basically comprised of dry-blending a particulate flow enhancing additive comprised of a particulate solid adsorbent material having a flow inducing chemical adsorbed thereon with one or more cementitious materials. Thereafter, the blend of the cementitious materials and flow enhancing additive can be placed in a storage tank and readily conveyed therefrom, either mechanically or pneumatically, without leaving a significant portion of the cementitious materials in the storage tank.

A variety of particulate solid adsorbent materials can be utilized for forming the flow enhancing additive of this invention. Examples of such adsorbent materials include, but are not limited to, precipitated silica, zeolite, talcum, diatomaceous earth and fuller's earth. Of these, precipitated silica is presently preferred. The adsorbent material utilized must be capable of adsorbing the flow inducing chemical utilized.

The flow inducing chemical utilized in accordance with this invention can be any of the heretofore known chemicals which produce polar molecules that react with cementitious materials and increase their flow properties. Examples of polar molecule producing chemicals which can be utilized include, but are not limited to, organic acids such as alkyl and/or alkene carboxylic acids and sulfonic acids, salts of the foregoing acids formed with weak bases and acid anhydrides such as sulfur dioxide, carbon dioxide, sulfur trioxide, nitrogen oxides and similar compounds. The most preferred flow inducing chemical for use in accordance with this invention is glacial acetic acid. While the exact cause for the flow enhancement of cementitious materials when contacted with a flow inducing chemical of this invention is presently unknown, it is believed that polar molecules of the chemical react with components of the cementitious materials such as tricalcium silicate to produce a particle repulsion effect in the cementitious materials.

The weight ratio of the particulate solid adsorbent material utilized to the flow inducing chemical utilized in the flow enhancing additive is generally in the range of from about 90:10 to about 10:90, more preferably from about 75:25 to about 25:75. The resulting particulate flow enhancing additive is dry-blended with one or more cementitious materials, the flow properties of which are to be improved, in an amount in the range of from about 0.01% to about 1.0% by weight of the cementitious materials, more preferably in an amount in the range of from about 0.02% to about 0.5%.

A method of the present invention for improving the flow properties of one or more dry particulate cementitious materials is comprised of dry-blending a particulate flow enhancing additive with the cementitious materials, the additive being comprised of a particulate solid adsorbent material having a flow inducing polar molecule producing chemical adsorbed thereon.

Another method of the present invention for improving the flow properties of one or more dry particulate cementitious materials is comprised of dry-blending a particulate flow enhancing additive with the cementitious materials in an amount in the range of from about 0.01% to about 1.0% by weight of the cementitious materials, the additive being comprised of a particulate solid adsorbent material having a flow inducing chemical adsorbed thereon selected from the group of polar molecule producing organic acids, their salts and acid anhydrides.

Yet another method of the present invention for improving the flow properties of one or more dry particulate cementitious materials is comprised of dry-blending with the cementitious materials a particulate flow enhancing additive comprised of a particulate solid adsorbent material selected from the group of precipitated silica, zeolite and talcum having a flow inducing chemical adsorbed thereon selected from the group of polar molecule producing organic acids, their salts and acid anhydrides, the weight ratio of the solid adsorbent material to the flow inducing chemical being in the range of from about 90:10 to about 10:90 and the flow enhancing additive being blended with the cementitious materials in an amount in the range of from about 0.01% to about 1.0% by weight of the cementitious materials.

Still another method of this invention for improving the flow properties of one or more dry particulate cementitious materials is comprised of dry-blending a particulate flow enhancing additive with the cementitious materials, the additive being comprised of precipitated silica powder having a flow inducing chemical comprised of glacial acetic acid adsorbed thereon, the weight ratio of precipitated silica powder to glacial acetic acid being in the range of from about 75:25 to about 25:75 and the flow enhancing additive being blended with the cementitious materials in an amount in the range of from about 0.02% to about 0.5% by weight of the cementitious materials.

A method of this invention for storing one or more dry particulate cementitious materials in a storage tank, transporting the storage tank and cementitious materials to a location of use and then conveying the cementitious materials out of the storage tank without unintentionally leaving a significant portion of the cementitious materials in the storage tank is comprised of dry-blending a particulate flow enhancing additive with the cementitious materials prior to placing the materials in the storage tank, the additive being comprised of a particulate solid adsorbent material having a flow inducing polar molecule producing chemical adsorbed thereon; preferably a flow inducing polar molecule producing chemical selected from the group of organic acids, their salts and acid anhydrides.

Another method of this invention for storing one or more dry particulate cementitious materials in a storage tank, transporting the storage tank and cementing materials to a location of use and then conveying the cementitious materials out of the storage tank without unintentionally leaving a significant portion of the cementitious materials in the storage tank is comprised of dry-blending with the cementitious materials a particulate flow enhancing additive comprised of a particulate solid adsorbent material selected from the group of precipitated silica, zeolite and talcum having a flow inducing polar molecule producing chemical adsorbed thereon selected from the group of organic acids, salts thereof and acid anhydrides, the weight ratio of the solid adsorbent material to the flow inducing chemical being in the range of from about 90:10 to about 10:90 and the flow enhancing additive being blended with the cementitious materials in an amount in the range of from about 0.01% to about 1.0% by weight of the cementitious materials.

Yet another method of this invention for storing one or more dry particulate cementitious materials in the storage tank, transporting the storage tank and cementitious materials to a location of use and then conveying the cementitious materials out of the storage tank without unintentionally leaving a significant portion of the cementitious materials in the storage tank is comprised of dry-blending a particulate flow enhancing additive with the cementitious materials, the additive being comprised of precipitated silica powder having a flow inducing additive comprised of glacial acetic acid adsorbed thereon, the weight ratio of precipitated silica powder to glacial acetic acid being in the range of from about 75:25 to about 25:75 and the flow enhancing additive being blended with the cementitious materials in an amount in the range of from about 0.02% to about 0.5% by weight of the cementitious materials.

In order to further illustrate the methods of the present invention, the following examples are given.

EXAMPLE 1

Several cement blends were prepared as shown in Table I below.

TABLE I

Test Cement Blends

| Blend No. | API Portland Cement, lb/sack of Cement | 2 parts: 1 part by wt. Portland Cement- Ultra Fine Cement Mixture | 50%-50% Mixture of Ultra-Fine Cement and Ultra-Fine Fly Ash, % by Weight of Composition | Fumed Silica, lb/sack of Cement | Class F Pozzolan, lb/sack of Cement | Calcium Chloride, % by weight of Cement | Particulate Crystalline Silica, % by weight of Composition |
|---|---|---|---|---|---|---|---|
| 1 | 47 | — | — | 18.5 | 18.5 | 1 | — |
| 2 | — | — | 65 | — | — | — | 35 |
| 3 | — | 98 | — | — | — | 2 | — |

The cement blends were each tested by placing a volume of each blend sufficient to achieve a packed thickness of approximately ¾" in a 200 ml flask. The cement blend was swirled in the flask until a level cement surface was produced. The flask containing the cement blend was then placed on a vibrator and vibrated for the time period indicated in Table II below. The vibrator was an FMC Syntron Jogger, Model J-1, 115 Volts/60 Hz/1 AMP equipped with a PowerStat voltage regulator. After being vibrated, the flask containing the cement blend was removed from the vibrator and placed on a rotator for slowly rotating the flask in a vertical plane and counting the number of rotations. The flask was rotated for the number of counts required for the cement blend in the flask to decompact therein. After the cement blend decompacted, the flask and cement blend were vigorously shaken and the cement blend was swirled for 5 seconds whereupon the test was repeated. This procedure was followed for a total of five tests or until consistent results were observed.

The above described tests were repeated at a number of higher and lower vibration frequencies (as indicated by the voltage set on the voltage regulator) and for different times until a maximum average count was determined. The results of these tests are set forth in Table II below.

TABLE II

Maximum Average Rotator Counts

| | Blend No. 1 | Blend No. 2 | Blend No. 3 |
|---|---|---|---|
| Vibrator Voltage volts | 54 | 56 | 54 |
| Vibration Time, seconds | 20 | 25 | 20 |
| | Rotator Counts | | |
| 1st Test | 36 | 30 | 30 |
| 2nd Test | 31 | 22 | 36 |
| 3rd Test | 33 | 31 | 27 |
| 4th Test | 41 | 26 | 36 |
| 5th Test | 21 | 29 | 38 |
| 6th Test | 37 | — | — |
| Average Count | 33.2 | 27.6 | 33.4 |

EXAMPLE 2

The cement blends described in Example 1 were combined with varying amounts of the flow enhancing additive of the present invention. The additive was comprised of precipitated silica powder and glacial acetic acid having a weight ratio of silica to acid of 1:1. The results of these tests are set forth in Table III below.

TABLE III

Test Rotator Counts When Flow Enhancing Additive Included In Cement Blends

| | Blend No. 1 | Blend No. 2 | Blend No. 3 |
|---|---|---|---|
| Vibrator Voltage volts | 54 | 56 | 54 |
| Vibration Time, seconds | 20 | 25 | 20 |
| Quantity of Additive, % by wt. of Blend | Rotator Counts | | |
| 0 | 33.2 | 27.6 | 33.4 |
| 0.05 | 15.6 | 10.8 | 26.6 |
| 0.075 | 15 | 9 | 20.4 |
| 0.1 | — | 7.8 | 11.6 |
| 0.125 | — | 5 | 9.2 |
| 0.15 | — | 6 | 6.6 |
| 0.175 | — | — | 4.2 |

As can be seen from the test results given in Table III, the addition of the additive of this invention to the cement blends resulted in significant flow enhancement.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A particulate flow enhancing additive for improving the flow properties of dry particulate cementitious materials consisting essentially of a particulate solid adsorbent material having a flow inducing chemical adsorbed thereon;

wherein said flow inducing chemical is selected from the group consisting of polar molecule producing organic acids, salts of organic acids and acid anhydrides; and wherein the weight ratio of said particulate solid adsorbent material to said flow inducing chemical is in the range of from about 90:10 to about 10:90.

2. The flow enhancing additive of claim 1 wherein said particulate solid adsorbent material is precipitated silica.

3. The flow enhancing additive of claim 1 wherein said flow inducing chemical is a compound which produces polar molecules that react with cementitious materials and increase their flow properties.

4. The flow enhancing additive of claim 1 wherein said flow inducing chemical is a polar molecule producing organic acid selected from the group consisting of alkyl carboxylic acids and salts of such acids formed with weak bases.

5. The flow enhancing additive of claim 1 wherein said flow inducing chemical is a polar molecule producing acid anhydride selected from the group consisting of polar sulfur dioxide, carbon dioxide, sulfur trioxide and nitrogen oxides.

6. The flow enhancing additive of claim 1 wherein said flow inducing chemical is glacial acetic acid.

7. The flow enhancing additive of claim 1 wherein said particulate solid adsorbent is precipitated silica and said flow inducing chemical is glacial acetic acid.

8. The flow enhancing additive of claim 1 wherein the weight ratio of said particulate solid adsorbent material to said flow inducing chemical adsorbed thereon is in the range of from 75:25 to about 25:75.

9. The flow enhancing additive of claim 7 wherein the weight ratio of said precipitated silica to said glacial acetic acid is in the range of from about 75:25 to about 25:75.

* * * * *